(12) United States Patent
Tada

(10) Patent No.: US 12,105,035 B2
(45) Date of Patent: Oct. 1, 2024

(54) X-RAY SPECTROMETER AND PULSE HEIGHT PREDICTION PROGRAM

(71) Applicant: Rigaku Corporation, Akishima (JP)

(72) Inventor: Tsutomu Tada, Takatsuki (JP)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 18/685,491

(22) PCT Filed: May 10, 2022

(86) PCT No.: PCT/JP2022/019808
§ 371 (c)(1),
(2) Date: Feb. 21, 2024

(87) PCT Pub. No.: WO2023/026598
PCT Pub. Date: Mar. 2, 2023

(65) Prior Publication Data
US 2024/0264098 A1    Aug. 8, 2024

(30) Foreign Application Priority Data
Aug. 24, 2021    (JP) ................... 2021-136599

(51) Int. Cl.
*G01N 23/223*    (2006.01)
*G01N 23/2252*    (2018.01)
(Continued)

(52) U.S. Cl.
CPC ....... *G01N 23/223* (2013.01); *G01N 23/2252* (2013.01); *G01N 2223/076* (2013.01);
(Continued)

(58) Field of Classification Search
None
See application file for complete search history.

(56) References Cited

U.S. PATENT DOCUMENTS

| 5,576,658 | A | 11/1996 | Hushimi et al. |
| 8,374,814 | B2 * | 2/2013 | Sako ............ G01T 1/17 |
| | | | 702/78 |

(Continued)

FOREIGN PATENT DOCUMENTS

| CN | 101566591 A | 10/2009 |
| CN | 103605148 A | 2/2014 |

(Continued)

OTHER PUBLICATIONS

V. T. Jordanov et al., "Digital techniques for real-time pulse shaping in radiation measurements" Nuclear Instruments and Methods in Physics Research A 353 (1994) p. 261-264.

(Continued)

*Primary Examiner* — Thomas R Artman
(74) *Attorney, Agent, or Firm* — HEA Law PLLC

(57) ABSTRACT

To measure a pulse height of an X-ray signal at high speed and with high precision even for high count rate X-ray measurement regardless of the type of an X-ray detector and a circuit configuration of a preamplifier, provided is an X-ray spectrometer including: a learning unit which acquires a part of a stepped wave including a rise portion through use of incident time, and generates a trained model which has learned a correlation between a acquired part and a pulse height through use of training data including a plurality of combinations of the acquired part and the pulse height; and a pulse height predictor which acquires a part of the stepped wave from the newly converted stepped wave through use of the incident time, and calculates a predicted pulse height from the acquired part of the stepped wave and the trained model.

11 Claims, 14 Drawing Sheets

(51) Int. Cl.
G01T 1/17 (2006.01)
G01T 1/36 (2006.01)

(52) U.S. Cl.
CPC ............... *G01N 2223/1016* (2013.01); *G01N 2223/304* (2013.01); *G01N 2223/305* (2013.01); *G01T 1/36* (2013.01)

(56) References Cited

U.S. PATENT DOCUMENTS

| | | | |
|---|---|---|---|
| 9,188,552 B2* | 11/2015 | Kinugasa | G01N 23/223 |
| 9,791,393 B2* | 10/2017 | Sako | G01N 23/223 |
| 10,345,249 B1* | 7/2019 | Jach | G01T 1/36 |
| 10,914,844 B2* | 2/2021 | Tada | G01T 1/17 |
| 11,079,502 B2* | 8/2021 | Scoullar | G01T 1/366 |
| 2012/0207277 A1 | 8/2012 | Sako | |
| 2014/0197307 A1 | 7/2014 | Jorion | |
| 2015/0276630 A1* | 10/2015 | Kinugasa | G01T 1/17 378/46 |
| 2016/0313459 A1 | 10/2016 | Scoullar et al. | |
| 2017/0153190 A1* | 6/2017 | Sako | G01R 13/00 |
| 2019/0154847 A1 | 5/2019 | Ohashi | |
| 2019/0187075 A1* | 6/2019 | Jach | G01N 23/083 |
| 2019/0302041 A1 | 10/2019 | Sako | |
| 2020/0209408 A1 | 7/2020 | Tada et al. | |
| 2020/0271599 A1* | 8/2020 | Rettenmeier | G01T 1/24 |
| 2023/0152251 A1 | 5/2023 | Murata | |

FOREIGN PATENT DOCUMENTS

| | | |
|---|---|---|
| CN | 107817514 A | 3/2018 |
| CN | 110088605 A | 8/2019 |
| JP | H07-333346 A | 12/1995 |
| JP | H10-318946 A | 12/1998 |
| JP | 2012-168124 A | 9/2012 |
| JP | 2017-512297 A | 5/2017 |
| JP | 2018-091691 A | 6/2018 |
| JP | 2019-066243 A | 4/2019 |
| JP | 2021004779 A | 1/2021 |
| WO | 2017/187972 A1 | 11/2017 |
| WO | 2018/101133 A1 | 6/2018 |
| WO | 2018100873 A1 | 6/2018 |
| WO | 2021/075345 A1 | 4/2021 |
| WO | 2021/220657 A1 | 11/2021 |

OTHER PUBLICATIONS

International Search Report of Jul. 19, 2022 for International Patent Application No. PCT/JP2022/019808 with English translation, pp. 1-6.

Office Action of Jul. 11, 2024, for corresponding CN Patent Application No. 202280057712.X with partial English translation, pp. 1-7.

* cited by examiner

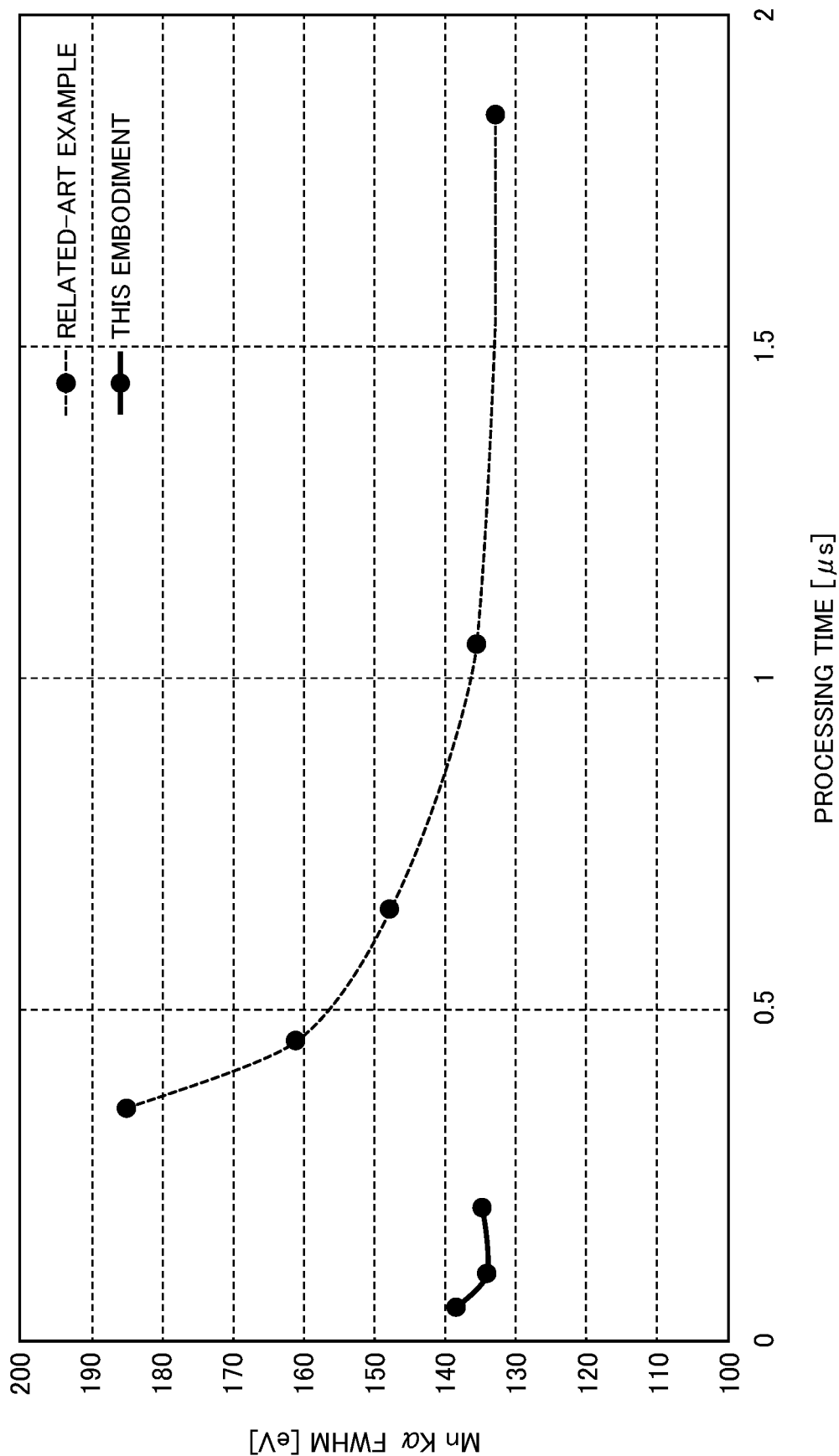

X-RAY SPECTROMETER AND PULSE HEIGHT PREDICTION PROGRAM

CROSS REFERENCE TO RELATED APPLICATIONS

This application is a National Stage of International Application No. PCT/JP2022/019808 filed on May 10, 2022, which claims priority from Japanese Patent Application 2021-136599, filed on Aug. 24, 2021. The contents of the above document are incorporated herein by reference in its entirety.

TECHNICAL FIELD

The present invention relates to an X-ray spectrometer and a pulse height prediction program.

BACKGROUND ART

An X-ray spectrometer is known as an apparatus for measuring an element contained in a sample and a concentration of the element. The X-ray spectrometer analyzes the element contained in the sample and the like based on X-rays emitted when primary X-rays or an exciting radiation such as an electron beam or a particle beam are applied to the sample.

The X-ray spectrometer first uses an X-ray detector to detect X-rays emitted from a sample which is excited by the application of the primary X-rays or from which the applied primary X-rays are reflected, for example. An integrated amount of electric charges output from the X-ray detector is converted by a preamplifier into a voltage signal corresponding to the integrated amount, and the voltage signal is input to a waveform shaping digital filter. The waveform shaping digital filter shapes the voltage signal into a pulse signal formed of a trapezoidal wave, for example. A pulse height of the pulse signal corresponds to energy of X-rays, and an X-ray energy spectrum is obtained by counting the pulse signal for each pulse height (see Patent Literature 1, Patent Literature 2, and Patent Literature 3, and Non Patent Literature 1).

The X-rays emitted from the sample enter the X-ray detector at random time intervals. Accordingly, when a shaping time of the waveform shaping digital filter is set short to shorten a rise time and a fall time of the pulse signal, the X-rays entering the X-ray detector can be detected without failing to acquire the X-rays.

However, when the shaping time is set short, electronic noise caused by series noise increases, and a measured value of the pulse height varies. As a result, an energy resolution of the X-ray energy spectrum deteriorates.

Thus, in Patent Literature 4, there is disclosed a radiation detection system which smooths a flat part of a stepped digital voltage signal excluding a step part caused by X-ray incidences through use of a denoising filter. With the denoising filter, the deterioration of the energy resolution caused by setting the shaping time of the waveform shaping digital filter short is suppressed.

Further, in Patent Literature 5, there are disclosed a method and apparatus for obtaining the pulse height of an output signal corresponding to X-ray energy by modeling X-ray signal waveform data with a function and executing fitting with the function. With the execution of fitting in place of the above-mentioned waveform shaping, the pulse height can be measured at high speed, and hence the frequency of failure to acquire X-rays is reduced.

CITATION LIST

Patent Literature

[PTL 1] JP 07-333346 A
[PTL 2] JP 10-318946 A
[PTL 3] JP 2012-168124 A
[PTL 4] WO 2017/187972 A1
[PTL 5] JP 2017-512297 A

Non Patent Literature

[NPL 1] V. T. Jordanov, G. F. Knoll, A. C. Huber, and J. A. Pantazis, Nucl Instr. and Meth. A 353 (1994) 261-264.

SUMMARY OF INVENTION

Technical Problem

In Patent Literature 4, the flat part excluding the step part caused by X-ray incidences is smoothed through use of the denoising filter. However, when an incident count rate of X-rays increases, a proportion of the step part caused by X-ray incidences becomes larger, and a proportion of the flat part becomes smaller. As a result, the effect of noise removal by smoothing decreases. Consequently, the measured value of the pulse height varies more greatly, and the energy resolution of the X-ray energy spectrum deteriorates.

With Patent Literature 5, the pulse height of the output signal corresponding to the X-ray energy is obtained by modeling the X-ray signal waveform data with the function and executing fitting using the function. Meanwhile, the model of the X-ray signal waveform data depends on the type of the X-ray detector, a circuit configuration of the preamplifier, and the like. Accordingly, a user is required to build a new model for each X-ray detector and each preamplifier.

The present invention has been made in view of the above-mentioned problems, and has an object to provide an X-ray spectrometer and a pulse height prediction program with which a pulse height of an X-ray signal can be measured at high speed and with high precision even for high count rate X-ray measurement regardless of the type of X-ray detector and a circuit configuration of a preamplifier.

Solution to Problem (1) According to one aspect of the present disclosure, there is provided an X-ray spectrometer including: an exciting radiation source configured to apply an exciting radiation to a sample; an X-ray detector configured to detect X-rays emitted from the sample to generate electric charges corresponding to energy of the X-rays; a preamplifier configured to output an analog signal representing a temporal change of a voltage corresponding to the generated electric charges; an A/D converter configured to convert the analog signal into a digital signal; a signal detector configured to detect, from the digital signal, an incident time at which the X-rays enter the X-ray detector; a waveform converter configured to convert the digital signal into a stepped wave including a flat portion before a rise portion, the rise portion, and a flat portion after the rise portion; a waveform shaper configured to shape the stepped wave to generate a shaped wave including a step or a peak; a pulse height analyzer configured to measure a pulse height based on the incident time and the step or peak of the shaped wave; a learning unit configured to acquire a part of the stepped wave including the rise portion through use of the incident time, and generate a trained model which has learned a correlation between the acquired part of the stepped wave and the pulse height through use of training data including a plurality of combinations of the acquired part of the stepped wave and the pulse height; and a pulse height predictor configured to acquire a part of the stepped wave from the stepped wave newly converted by the waveform converter through use of the incident time, and calculate a predicted pulse height from the acquired part of the stepped wave and the trained model.

(2) In the above-mentioned aspect of the present disclosure, the acquired part of the stepped wave included in the training data is a part of the rise portion, and the pulse height predictor is configured to acquire a part of the rise portion from the stepped wave newly converted by the waveform converter through use of the incident time, and calculate a predicted pulse height from the acquired part of the rise portion and the trained model.

(3) In the above-mentioned aspect of the present disclosure, the X-ray spectrometer further includes a selector configured to select any one of the pulse height and the predicted pulse height and output the selected one of the pulse height and the predicted pulse height.

(4) In the above-mentioned aspect of the present disclosure, the selector is configured to select any one of the pulse height and the predicted pulse height and output the selected one of the pulse height and the predicted pulse height in accordance with an incident count rate of the X-rays into the X-ray detector.

(5) In the above-mentioned aspect of the present disclosure, the X-ray spectrometer further includes a determination unit configured to determine whether re-learning is to be performed based on the pulse height and the predicted pulse height.

(6) In the above-mentioned aspect of the present disclosure, the determination unit is configured to determine whether re-learning is to be performed in accordance with a difference between the pulse height and the predicted pulse height, and a first threshold value set in advance.

(7) In the above-mentioned aspect of the present disclosure, the X-ray spectrometer further includes a counter configured to perform counting for each pulse height or each predicted pulse height to generate a histogram, and the determination unit is configured to determine whether re-learning is to be performed in accordance with a difference between a measure of dispersion of the pulse height and a measure of dispersion of the predicted pulse height at a peak of the histogram, and a second threshold value set in advance.

(8) In the above-mentioned aspect of the present disclosure, the sample to be used to acquire the training data is a sample that is free from an analysis target element.

(9) In the above-mentioned aspect of the present disclosure, the sample is graphite or acrylic.

(10) In the above-mentioned aspect of the present disclosure, the trained model is built through use of a regression algorithm of machine learning.

(11) In the above-mentioned aspect of the present disclosure, the trained model is built through use of a decision tree algorithm.

(12) According to another aspect of the present disclosure, there is provided a pulse height prediction program, which is executed by an information processing apparatus to be used for an X-ray spectrometer, the X-ray spectrometer including: an exciting radiation source configured to apply an exciting radiation to a sample; an X-ray detector configured to detect X-rays emitted from the sample to generate electric charges corresponding to energy of the X-rays; a preamplifier configured to output an analog signal representing a temporal change of a voltage corresponding to the generated electric charges; an A/D converter configured to convert the analog signal into a digital signal; a signal detector configured to detect, from the digital signal, an incident time at which the X-rays enter the X-ray detector; a waveform converter configured to convert the digital signal into a stepped wave including a flat portion before a rise portion, the rise portion, and a flat portion after the rise portion; a waveform shaper configured to shape the stepped wave to generate a shaped wave including a step or a peak; and a pulse height analyzer configured to measure a pulse height based on the incident time and the step or peak of the shaped wave; the pulse height prediction program causing the information processing apparatus to execute: a learning step of acquiring a part of the stepped wave including the rise portion through use of the incident time, and generating a trained model which has learned a correlation between the acquired part of the stepped wave and the pulse height through use of training data including a plurality of combinations of the acquired part of the stepped wave and the pulse height; and a pulse height prediction step of acquiring a part of the stepped wave from the stepped wave newly converted by the waveform converter through use of the incident time, and calculating a predicted pulse height from the acquired part of the stepped wave and the trained model.

Advantageous Effects of Invention

According to the present disclosure, the pulse height of the X-ray signal can be measured at high speed and with high precision even for high count rate X-ray measurement regardless of the type of the X-ray detector and the circuit configuration of the preamplifier.

BRIEF DESCRIPTION OF DRAWINGS

FIG. 14 is a graph for showing full widths at half maximum in the related-art example and the embodiment at each processing time.

DESCRIPTION OF EMBODIMENTS

Figure 1:
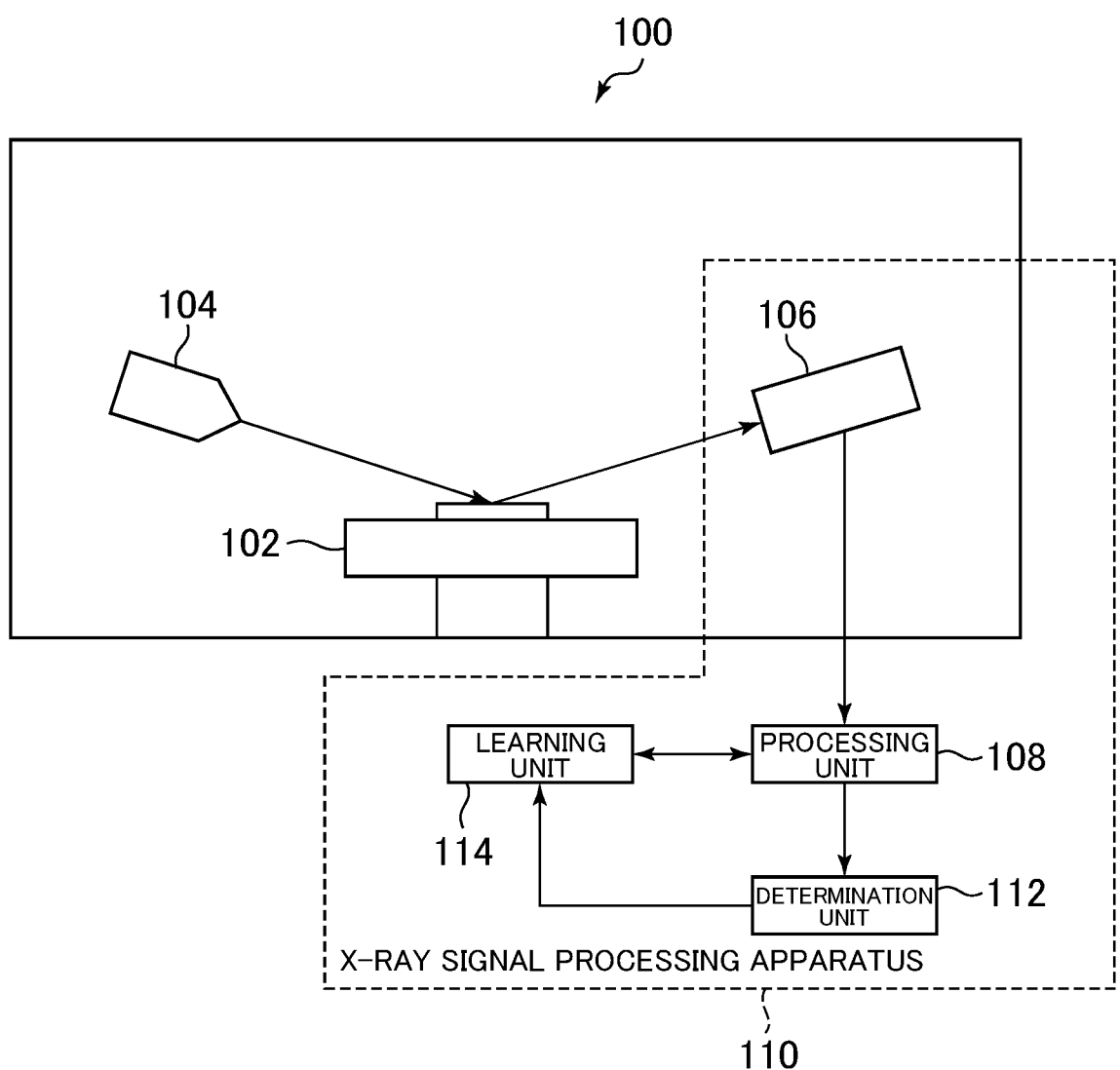
FIG. 1 is a diagram for schematically illustrating an X-ray spectrometer according to an embodiment of the present invention.
Figure 2:
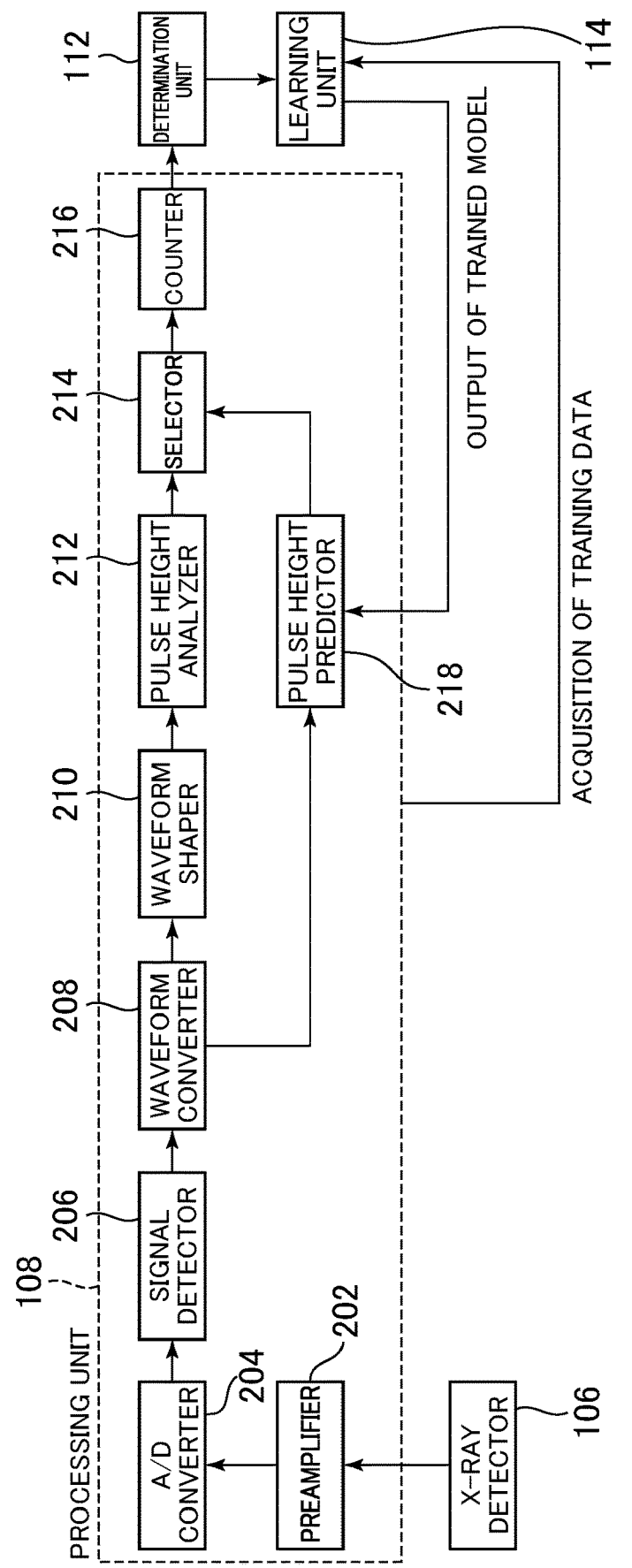
FIG. 2 is a diagram for schematically illustrating an X-ray signal processing apparatus in the embodiment of the present invention.

Now, a preferred embodiment for carrying out the present invention (hereinafter referred to as "embodiment") will be described. FIG. 1 is a diagram for schematically illustrating an X-ray spectrometer 100 according to the present invention. FIG. 2 is a diagram for schematically illustrating an X-ray signal processing apparatus 110 in the present invention.

The X-ray spectrometer 100 includes a sample stage 102, an exciting radiation source 104, and the X-ray signal processing apparatus 110. The X-ray signal processing apparatus 110 includes an X-ray detector 106, a processing unit 108, a determination unit 112, and a learning unit 114. The learning unit 114 and the determination unit 112 are implemented functionally by an information processing apparatus to be used for the X-ray spectrometer 100, and the information processing apparatus is a personal computer, for example.

A sample is placed on the sample stage 102. The sample is a target to be used to acquire training data or a target for which elemental analysis is to be performed. The exciting radiation source 104 applies an exciting radiation to the sample. Specifically, for example, the exciting radiation source 104 narrows X-rays generated by an X-ray tube (not shown) with a collimator (not shown), adjusts an incident X-ray spectral distribution with a filter (not shown), and applies the exciting radiation, being X-rays, onto a surface of the sample. X-rays are emitted from the sample to which the exciting radiation has been applied.

The X-ray detector 106 detects the X-rays emitted from the sample to generate electric charges corresponding to energy of the X-rays. Specifically, for example, the X-ray detector 106 detects the X-rays emitted when the exciting radiation is applied to the sample, to thereby generate the electric charges corresponding to the energy of the X-rays. The X-ray detector 106 is, for example, a semiconductor detector such as a Si (Li) detector and an SDD detector. The X-ray detector 106 may also be a scintillation detector or a proportional counter. Further, the X-rays emitted from the sample may be dispersed with an analyzing crystal (not shown), and the dispersed X-rays may be detected by the X-ray detector 106.

As illustrated in FIG. 2, the processing unit 108 includes a preamplifier 202, an A/D converter 204, a signal detector 206, a waveform converter 208, a waveform shaper 210, a pulse height analyzer 212, a selector 214, a counter 216, and a pulse height predictor 218.

The preamplifier 202 outputs an analog signal representing a temporal change of a voltage corresponding to the generated electric charges. Specifically, for example, the preamplifier 202 accumulates the electric charges input from the X-ray detector 106 in a capacitor (not shown), to thereby integrate the electric charges input from the X-ray detector 106 with respect to time and output a stepped voltage signal (hereinafter referred to as "stepped wave"). Further, the preamplifier 202 converts the stepped wave into a differential wave (see FIG. 3(a)) with a differentiating circuit (not shown), and outputs the differential wave to the subsequent A/D converter 204. The preamplifier 202 may be configured to output the voltage signal, being the stepped wave, to the subsequent A/D converter 204 without including the differentiating circuit. Further, in the following description, data representing the analog signal output from the preamplifier 202 and pieces of data representing respective signals generated based on the analog signal (pieces of waveform data shown in FIG. 3(a) to FIG. (e)) are collectively referred to as "X-ray signal data."

The A/D converter 204 converts the analog signal into a digital signal. Specifically, the A/D converter 204 converts the voltage signal, which is the analog signal output from the preamplifier 202, into a digital signal (see FIG. 3(b)) that can be processed by the subsequent signal detector 206.

Figure 3:
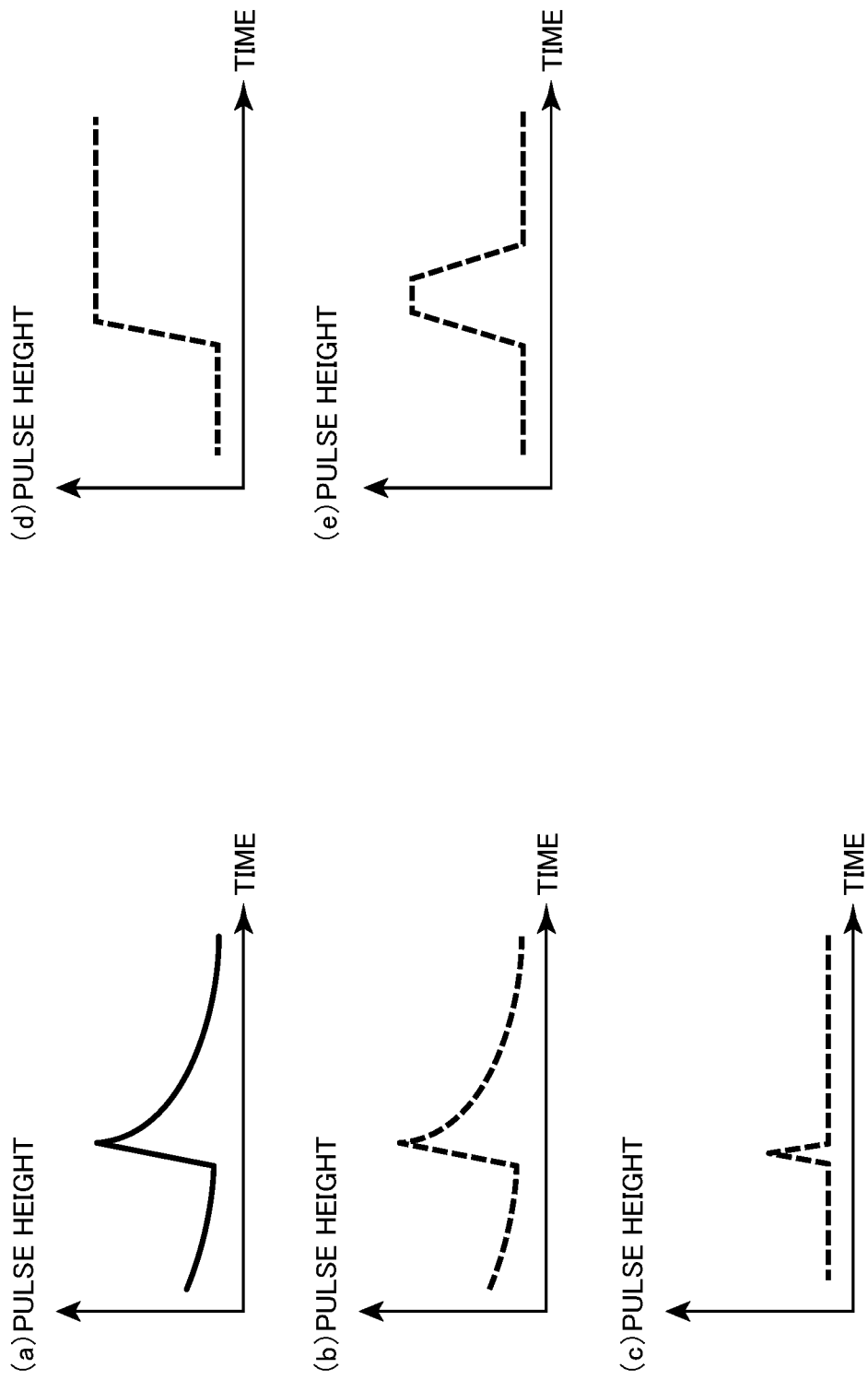
FIG. 3 are graphs for showing waveform shapes of X-ray signal data.

The signal detector 206 detects, from the digital signal, an incident time at which the X-rays enter the X-ray detector 106. Specifically, the signal detector 206 shapes the digital signal through use of a short waveform shaping time to detect signals of the X-rays that have entered the detector. For example, the signal detector 206 shapes the digital signal into a function wave such as a trapezoidal wave, a triangular wave, or a Gaussian wave having a small time width through use of a short waveform shaping time. FIG. 3(c) is a graph for showing an example of a triangular wave shaped by the signal detector 206. The waveform shaping time is therefor equal to or shorter than 50 ns, for example. The pulse height of the shaped waveform (shaped wave) is roughly proportional to the energy of the detected X-rays. The signal detector 206 detects the incident time of the X-ray signal by setting a predetermined threshold value for the pulse height of the shaped wave.

The waveform converter 208 converts the digital signal into a stepped wave including a flat portion before a rise portion, the rise portion, and a flat portion after the rise portion. Specifically, the waveform converter 208 performs, for the digital signal converted by the A/D converter 204, processing for removing attenuation corresponding to a time constant of the differentiating circuit included in the preamplifier 202, to convert the differential wave, being the digital signal, into the stepped wave. For example, the waveform converter 208 performs the conversion by performing processing such as delaying, addition/subtraction, multiplication, and integration for the digital signal through use of a correction coefficient for canceling an amount of attenuation by the time constant of the differentiating circuit. FIG. 3(d) is a graph for showing an example of the stepped wave converted by the waveform converter 208. When the preamplifier 202 does not include the differentiating circuit, the processing unit 108 is not required to include the waveform converter 208.

The waveform shaper 210 shapes the stepped wave to generate a shaped wave including a step or a peak. Specifically, the waveform shaper 210 shapes each step included in the stepped wave into a function wave such as a trapezoidal wave, a triangular wave, or a Gaussian wave having a pulse height corresponding to the height of the step. For example, FIG. 3(e) is a graph for showing an example of the trapezoidal wave shaped by the waveform shaper 210. The waveform shaping time is therefor, for example, 0.5 µs to 2 µs. The pulse height of the shaped waveform is proportional to the energy of the detected X-rays.

The pulse height analyzer 212 measures the pulse height based on the incident time and the step or peak of the shaped wave. Specifically, for example, the pulse height analyzer 212 is a multi-channel analyzer. The pulse height analyzer 212 calculates, based on the incident time detected by the signal detector 206, a pulse height of each of the flat portions of bottom and top portions of the trapezoidal wave. Further, the pulse height analyzer 212 measures the pulse height by calculating a difference between the pulse heights of the bottom and top portions. When the shaped wave is a triangular wave or a Gaussian wave, the pulse height analyzer 212 calculates, based on the incident time, a pulse height of each of a peak value of a triangular wave or a Gaussian wave and flat portions before and after the peak. Further, the pulse height analyzer 212 measures the pulse height by calculating a difference between the pulse heights of the peak value and the flat portions. The pulse height analyzer 212 converts, for example, the pulse height into an energy value of every 10 eV to discriminate one pulse height from another pulse height.

Figure 13:
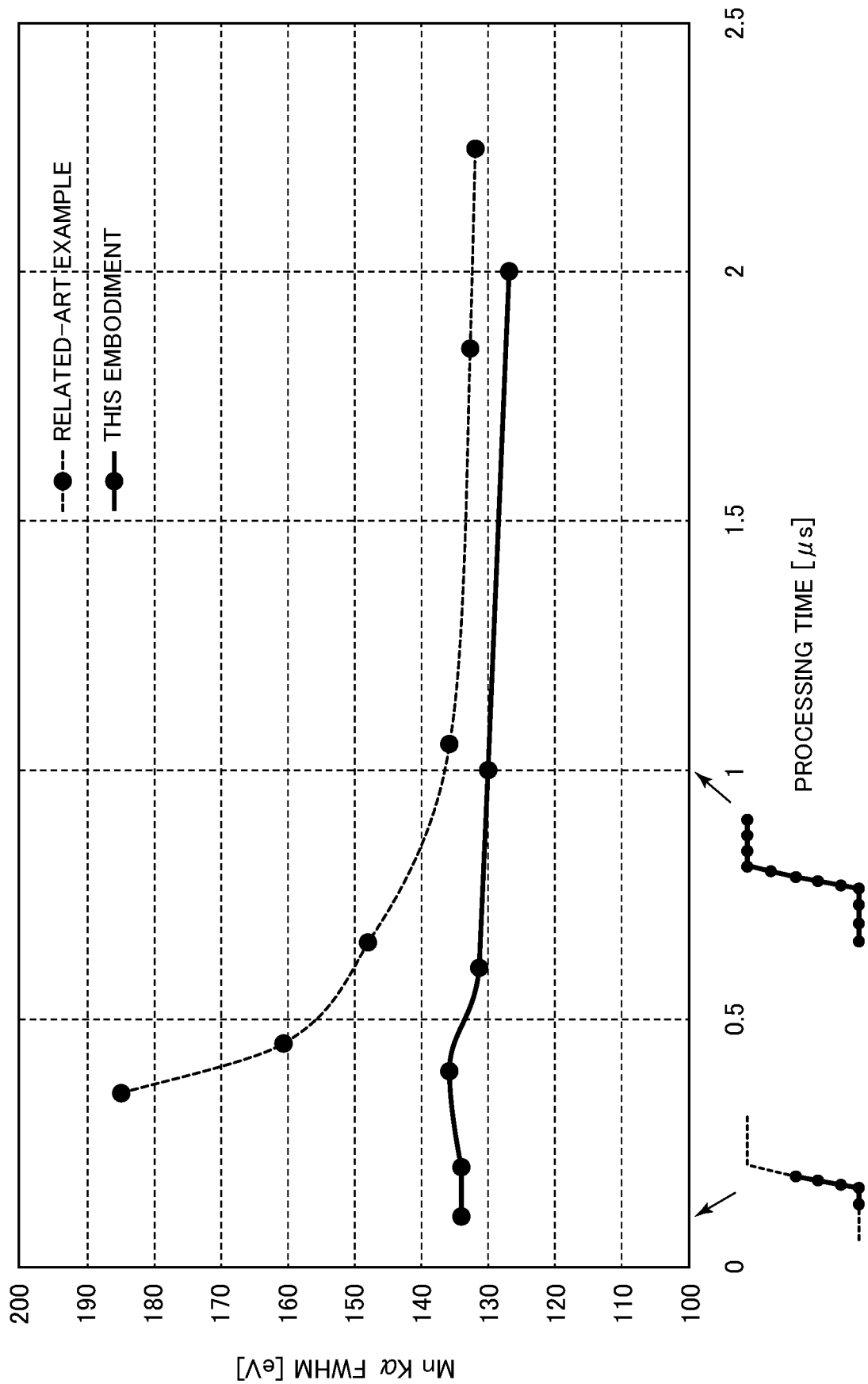
FIG. 13 is a graph for showing full widths at half maximum in the related-art example and the embodiment at each processing time.

The selector 214 selects any one of the pulse height and a predicted pulse height and outputs the selected one of the pulse heights. Specifically, for example, the selector 214 selects any one of the pulse height and the predicted pulse height and outputs the selected one of the pulse heights in accordance with an incident count rate of X-rays into the X-ray detector 106. In a case in which the incident count rate is higher than a predetermined threshold value, when the processing time (the waveform shaping time of the waveform shaper 210) is shortened in order to reduce the frequency of failure to acquire the X-rays, the variation of the pulse height increases, and hence an energy resolution of an X-ray energy spectrum deteriorates. Meanwhile, even when the processing time is set short, the variation of the predicted pulse height does not change greatly, and hence the energy resolution of the X-ray energy spectrum is satisfactory (FIG. 13 and FIG. 14). Thus, when the incident count rate is higher than the predetermined threshold value, the selector 214 selects and outputs the predicted pulse height, and when the incident count rate is lower than the predetermined threshold value, the selector 214 selects and outputs the pulse height. With this configuration, the X-ray energy can be measured at high speed and with high precision, and the frequency of failure to acquire the X-rays can be reduced. The selector 214 may make the selection in accordance with an instruction of software, or may make the selection in accordance with an instruction of a user.

The counter 216 performs counting for each pulse height or each predicted pulse height to generate a histogram. Specifically, the counter 216 performs counting for each channel corresponding to the energy of the X-rays based on the pulse height measured by the pulse height analyzer 212 or the predicted pulse height calculated by the pulse height predictor 218. Further, the counter 216 generates a histogram representing a frequency of acquisition for respective energies of the obtained X-rays.

The pulse height predictor 218 acquires a part of the stepped wave from the stepped wave newly converted by the waveform converter 208 through use of the incident time, and calculates the predicted pulse height from the acquired part of the stepped wave and a trained model (described later). A method of calculating the predicted pulse height will be described later.

The learning unit 114 acquires a part of the stepped wave including the rise portion through use of the incident time, and generates the trained model which has learned a correlation between the acquired part of the stepped wave and the pulse height through use of training data including a plurality of combinations of the acquired part of the stepped wave and the pulse height. A specific description is given with reference to a diagram of FIG. 4 for illustrating an example of the training data.

Figure 4:
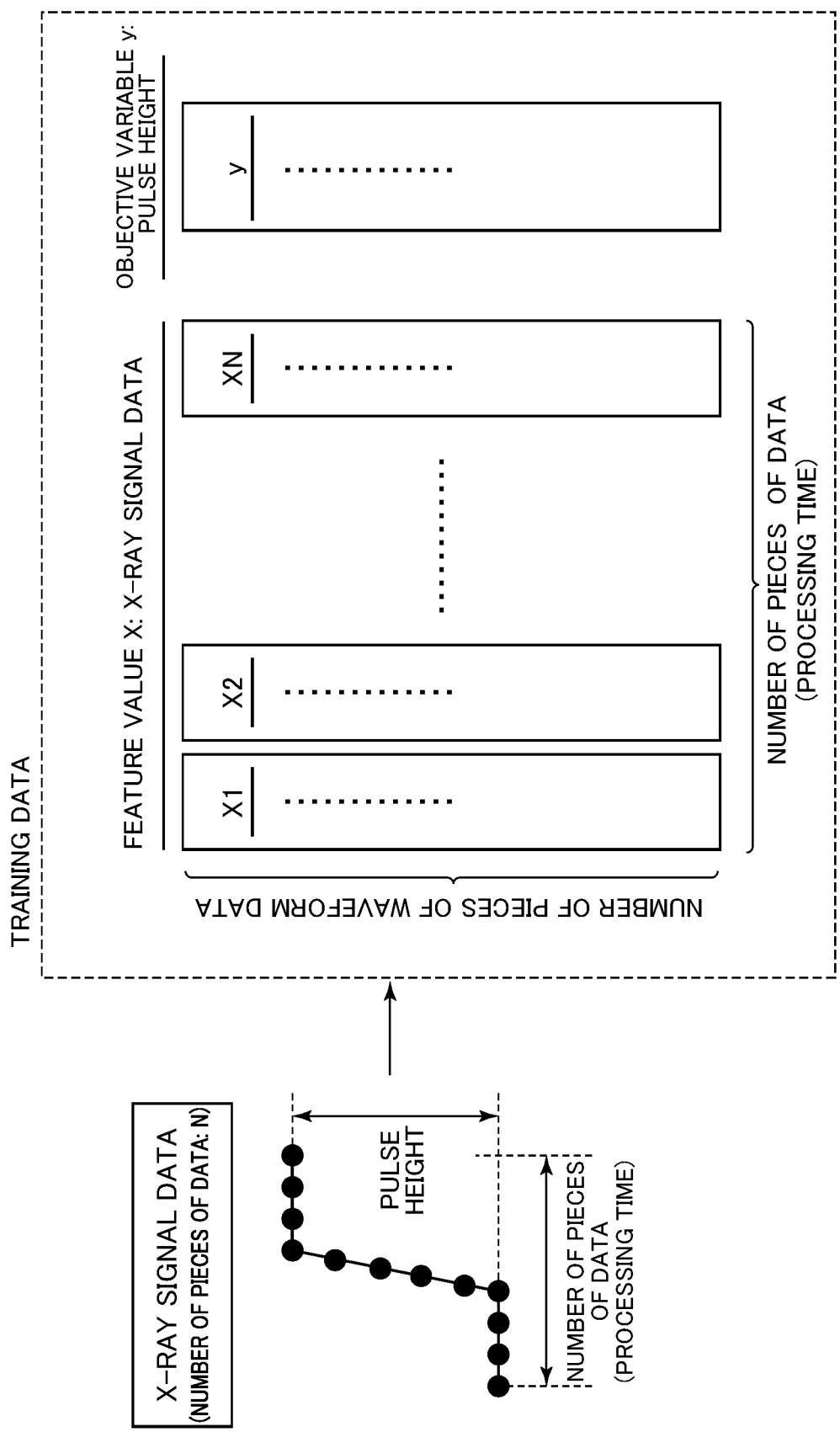
FIG. 4 is a diagram for illustrating training data.

As described above, the stepped wave includes a plurality of rise portions, and includes the flat portions before and after each rise portion. A waveform shown in the left part of FIG. 4 is the X-ray signal data representing one rise portion included in the stepped wave and the flat portions before and after the rise portion. The learning unit 114 sets a start position of the rise portion as the incident time to acquire pieces of X-ray signal data (X1 to XN) of the flat portion before the rise portion and the rise portion (which may be a part of the rise portion) following the flat portion. At this time, data points of the pieces of data X1 to XN are acquired such that the position of the incident time in the acquired pieces of X-ray signal data is constant. That is, the position of the data point of the piece of data X1 in the stepped wave is set with reference to the position of the incident time.

Further, the learning unit 114 acquires the pulse height (y) measured based on the shaped wave corresponding to the incident time. The learning unit 114 acquires the pieces of X-ray signal data (X1 to XN) being feature values and the pulse height being an objective variable as one combination. The training data includes a plurality of the combinations. The learning unit 114 uses the training data to generate the trained model which has learned the correlation between the part of the stepped wave and the pulse height.

The part of the stepped wave included in the training data is not limited to that described above as long as the part of the stepped wave includes at least a part of the rise portion. For example, the part of the stepped wave included in the training data may be waveform data of the rise portion and the flat portion after the rise portion. The part of the stepped wave included in the training data may also be only a part of the rise portion. Training performed by the learning unit 114, and the trained model, will be described later.

The determination unit 112 determines whether or not re-learning is to be performed based on the pulse height and the predicted pulse height. Details of the determination made by the determination unit 112 will be described later.

Figure 5:
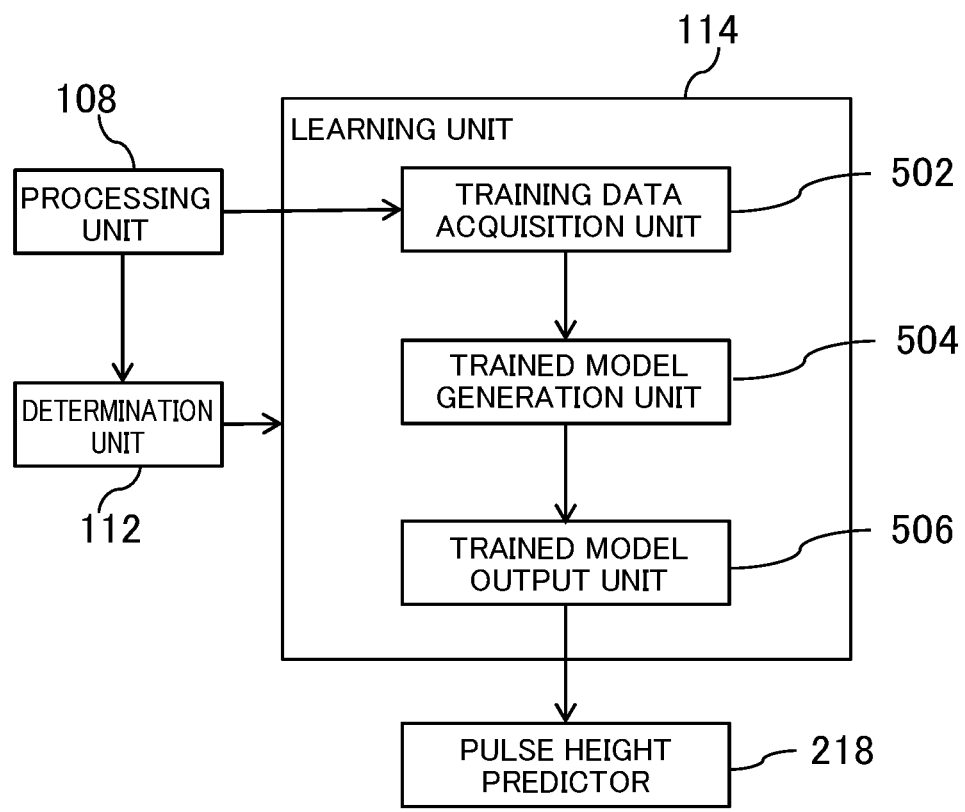
FIG. 5 is a diagram for illustrating a learning unit.

Next, details of the learning unit 114 will be described with reference to FIG. 5. The learning unit 114 includes a training data acquisition unit 502, a trained model generation unit 504, and a trained model output unit 506. The training data acquisition unit 502 acquires the training data including a plurality of combinations of a part of the stepped wave including the rise portion and the pulse height through use of the incident time.

The trained model generation unit 504 generates a trained model through use of the training data. Specifically, the trained model is built through use of a regression algorithm of machine learning. For example, the trained model is built through use of a decision tree algorithm (see FIG. 9). The generated trained model is output to the pulse height predictor 218 through the trained model output unit 506.

Further, the learning unit 114 acquires, from the determination unit 112, a result of determination of whether or not re-learning is to be performed. When the learning unit 114 acquires a result of determination indicating that re-learning is to be performed, the learning unit 114 acquires new training data again. Then, the learning unit 114 generates a trained model through use of the new training data, and outputs the trained model to the pulse height predictor 218.

Figure 6:
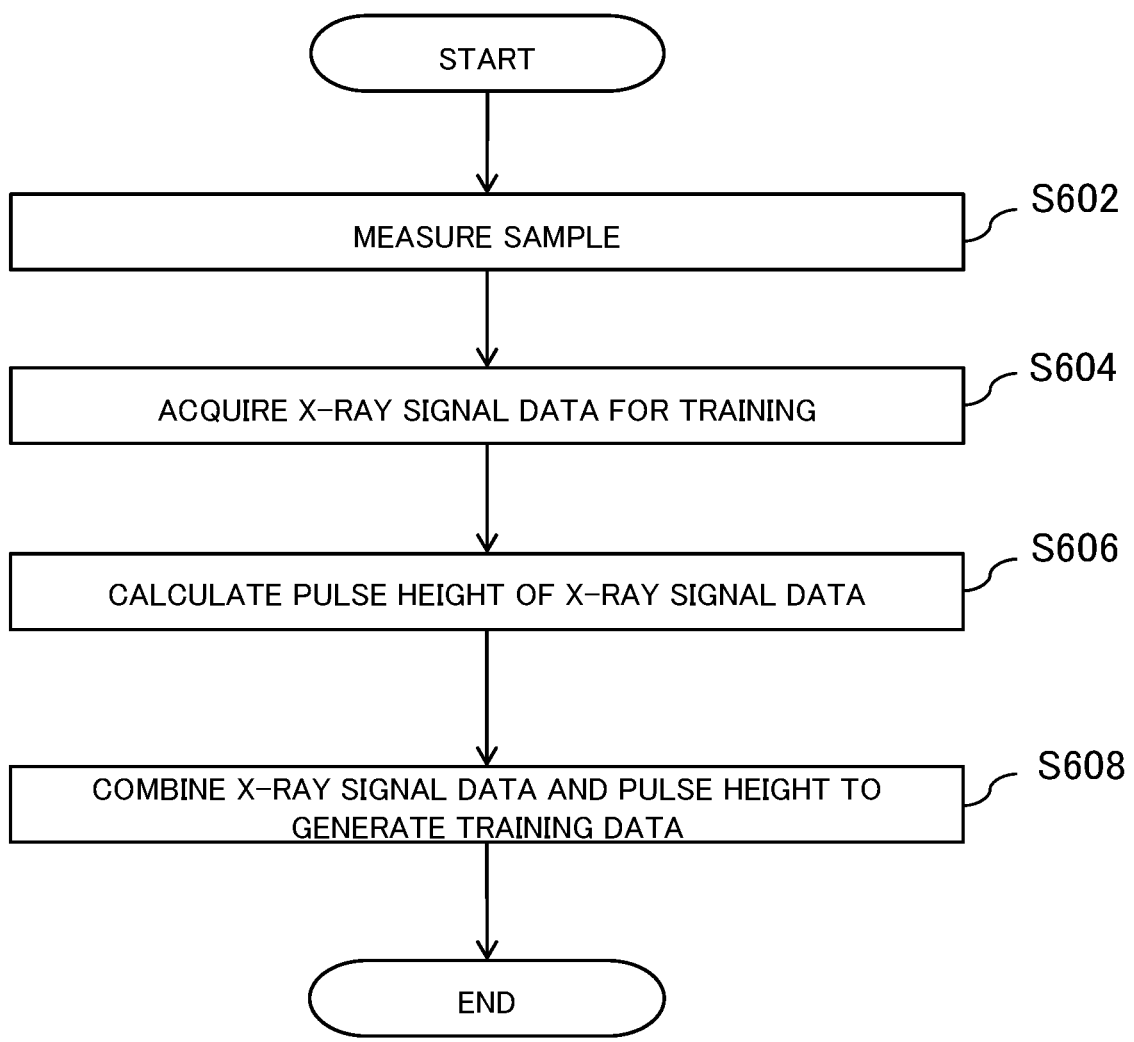
FIG. 6 is a flow chart for illustrating generation of training data.

FIG. 6 is a flow chart for illustrating generation of the training data. First, a sample is measured (Step S602). Specifically, first, the sample is placed on the sample stage 102. The sample is a sample containing a measurement target element. X-rays (fluorescent X-rays in this case) are emitted from the sample to which the exciting radiation has been applied by the exciting radiation source 104. The X-ray detector 106 detects the X-rays emitted from the measurement target element contained in the sample. The sample may be a sample that does not contain the measurement target element. Specifically, for example, the sample may be graphite or acrylic. In this case, the X-ray detector 106 detects continuous X-rays emitted from the sample.

Next, the training data acquisition unit 502 acquires X-ray signal data for training (Step S604). Specifically, the training data acquisition unit 502 uses the incident time to acquire, from the stepped wave output from the waveform converter 208, a part including the rise portion as the X-ray signal data. In this case, a plurality of pieces of X-ray signal data are acquired. The X-ray signal data may be only a part of the rise portion.

Next, the pulse height analyzer 212 measures a pulse height (Step S606). Specifically, for example, the pulse height analyzer 212 measures a pulse height of the stepped wave corresponding to each piece of X-ray signal data acquired in Step S604. At this time, the shaping time of the waveform shaper 210 is set such that a measure of dispersion (such as a variance, a standard deviation, or a coefficient of variation) of the pulse height becomes smaller. The waveform shaper 210 uses the set shaping time to generate the shaped wave, being the trapezoidal wave. The pulse height analyzer 212 uses the shaped trapezoidal wave to measure the pulse height. The waveform shaping time used when trapezoidal shaping is performed is, for example, about 1 µs to about 2 µs.

Next, the training data acquisition unit 502 combines the X-ray signal data and the pulse height measured from the X-ray signal data to generate training data (Step S608). Specifically, for example, the training data acquisition unit 502 acquires the X-ray signal data acquired in Step S604 and the pulse height corresponding to the X-ray signal data, and combines the X-ray signal data and the pulse height to generate the training data. At this time, the X-ray signal data and the pulse height acquired based on the same incident time are associated with each other.

Figure 7:
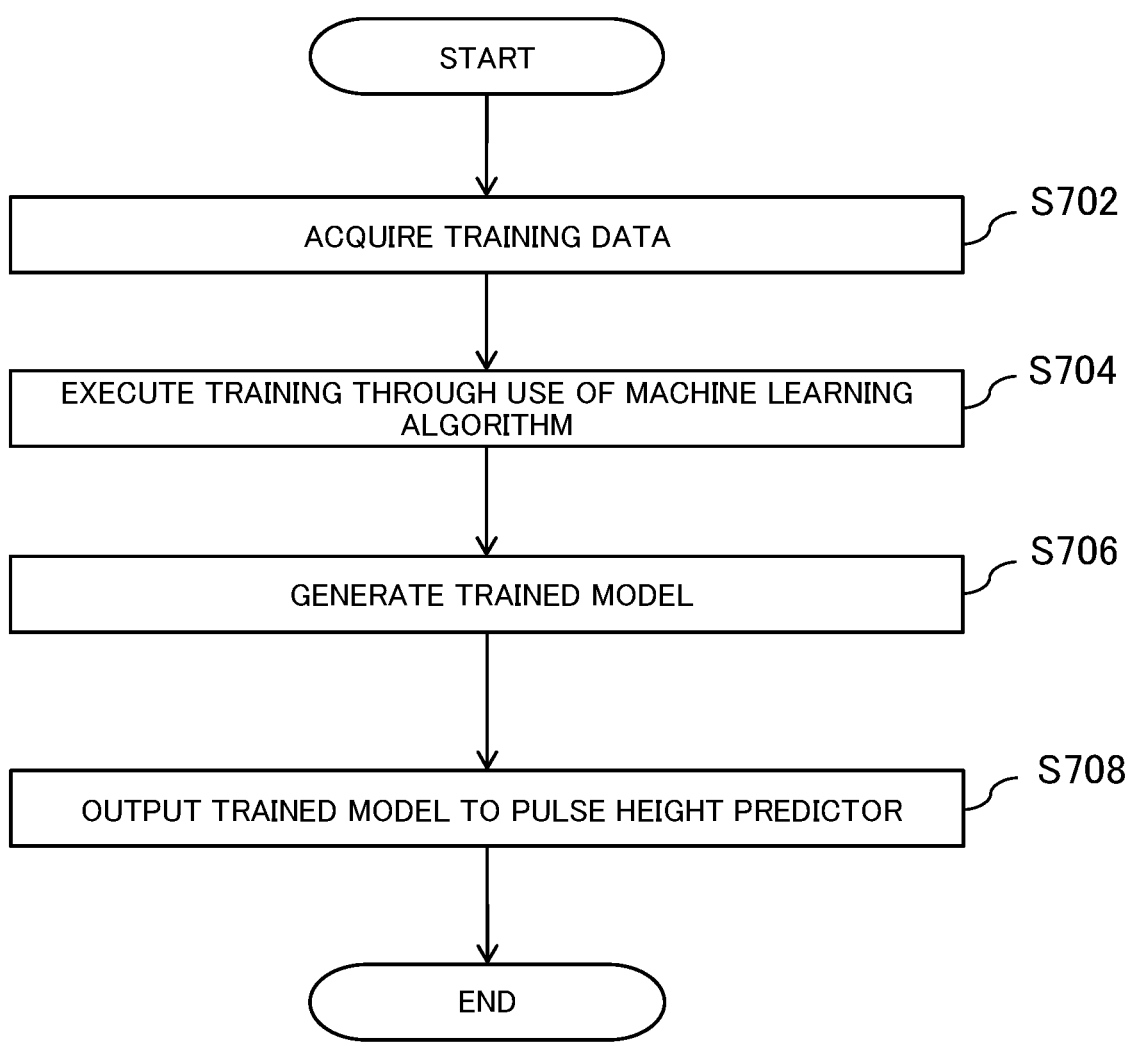
FIG. 7 is a flow chart for illustrating a learning method.

FIG. 7 is a flow chart for illustrating a learning method which uses the training data generated by the flow illustrated in FIG. 6. First, the training data acquisition unit 502 acquires the training data from the processing unit 108 (Step S702). Specifically, the training data acquisition unit 502 acquires the training data generated in Step S608.

Next, the trained model generation unit 504 performs learning through use of a machine learning algorithm (Step S704) to generate the trained model (Step S706). Specifically, for example, the machine learning algorithm is a decision tree. The trained model generation unit 504 uses a decision tree for the training data which is a combination of the X-ray signal data and the pulse height thereof to learn a correlation between the X-ray signal data and the pulse height. As a result, the trained model of the decision tree is generated. The trained model of the decision tree includes a condition for division of the X-ray signal data and a threshold value of the division required when the pulse height is predicted from the X-ray signal data. The trained model output unit 506 outputs the generated trained model to the pulse height predictor 218 (Step S708).

The machine learning algorithm is not limited to a decision tree, and may be a random forest or a gradient boosting algorithm which is based on a decision tree. The machine learning algorithm may also be an algorithm such as linear regression, a k-nearest neighbor algorithm, a neural network, or support vector regression.

Figure 8:
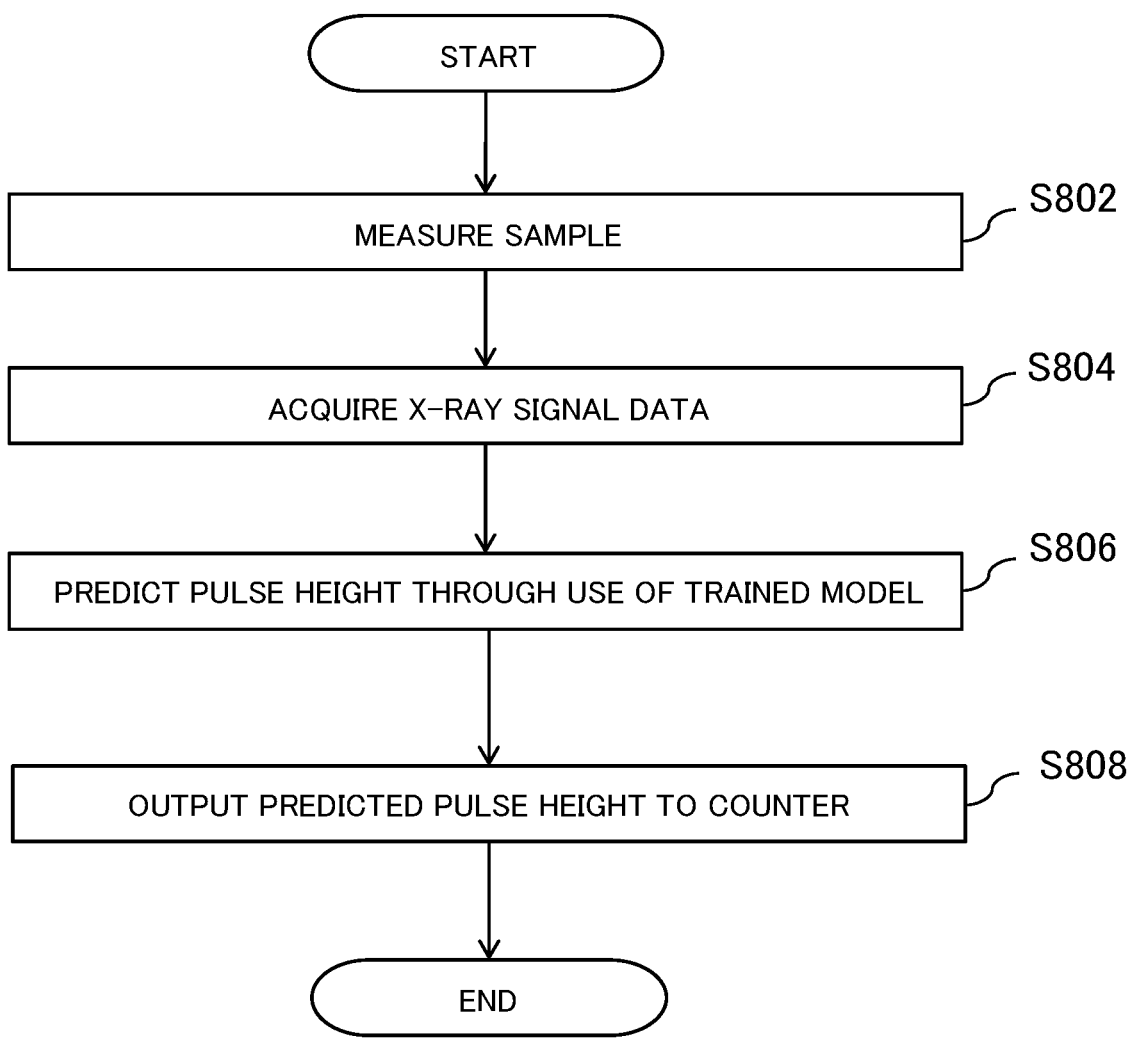
FIG. 8 is a flow chart for illustrating a method of calculating a predicted pulse height.

FIG. 8 is a flow chart for illustrating a method of predicting the pulse height through use of the trained model. First, a sample is measured (Step S802). The sample is an unknown sample which is a measurement target. X-rays are emitted from the sample to which the exciting radiation has been applied by the exciting radiation source 104. The X-ray detector 106 detects the X-rays emitted from the sample. This step is the same as Step S602 except that the sample is different.

Next, the pulse height predictor 218 acquires the X-ray signal data (Step S804). Specifically, the pulse height predictor 218 uses the incident time to acquire, from the stepped wave output from the waveform converter 208, a part including the rise portion as the X-ray signal data. At this time, the data points of the pieces of data X1 to XN are acquired such that the position of the incident time in the acquired X-ray signal data is the same as the position of the incident time in the X-ray signal data included in the training data. When the X-ray signal data included in the training data includes only a part of the rise portion, the X-ray signal data acquired by the pulse height predictor 218 also includes only a part of the rise portion.

Figure 9:
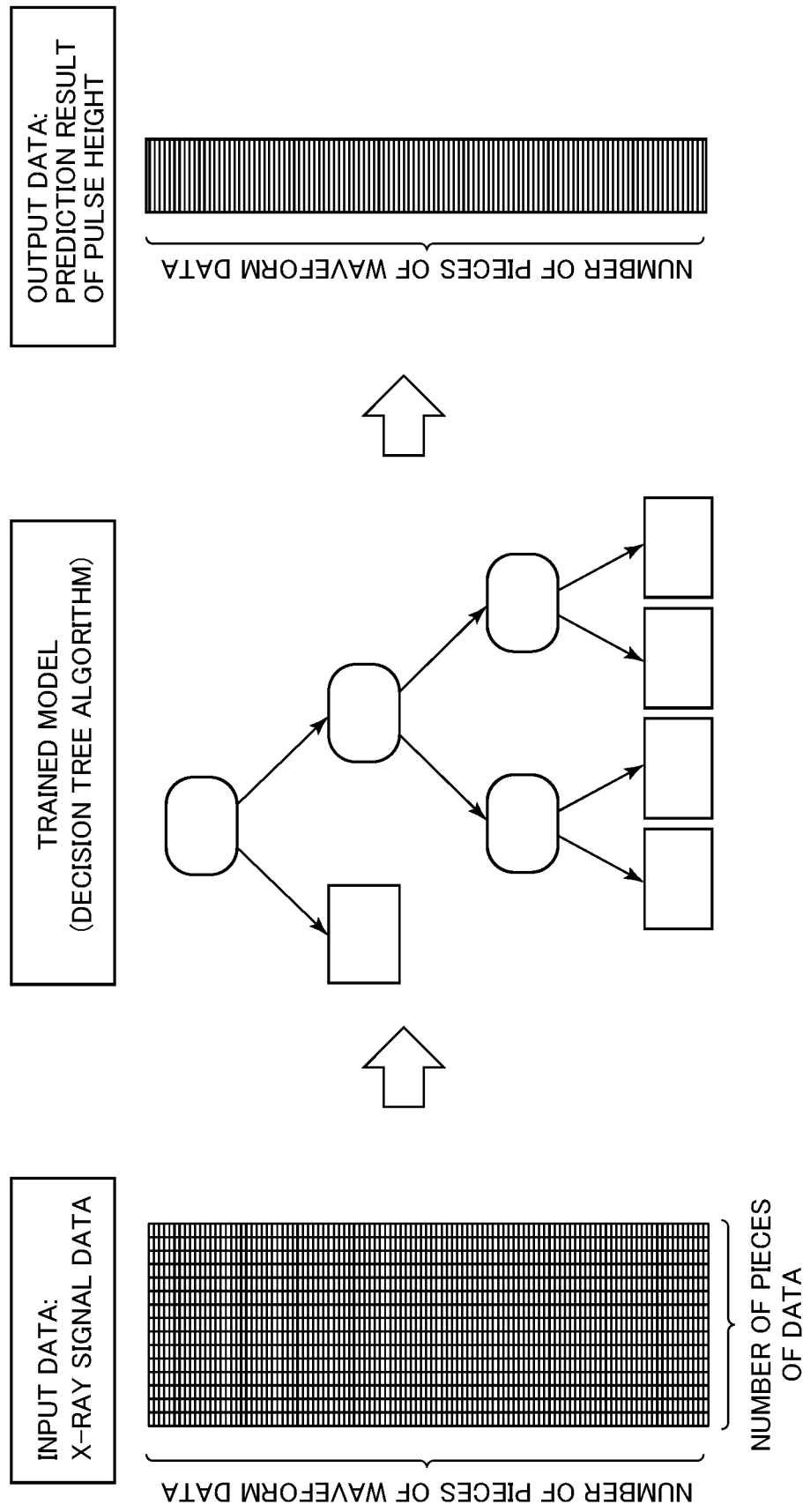
FIG. 9 is a schematic diagram of a trained model of a decision tree to be used in the embodiment.

Next, the pulse height predictor 218 calculates a predicted pulse height (Step S806). Specifically, the pulse height predictor 218 inputs the X-ray signal data acquired in Step S804 into the trained model generated in Step S706. FIG. 9 is a schematic diagram of the trained model to be used in this embodiment. The trained model is a decision tree including the condition for the division of the X-ray signal data and the threshold value of the division. Further, the pulse height predictor 218 has acquired the trained model in Step S708. When the X-ray signal data is input to the pulse height predictor 218, the trained model estimates the pulse height by classifying the X-ray signal data to output the predicted pulse height. Then, the pulse height predictor 218 outputs the predicted pulse height to the counter 216 (Step S808). With the steps described above, the predicted pulse height of each piece of X-ray signal data is acquired.

In this embodiment, the learning unit 114 may perform re-learning in accordance with the determination of the determination unit 112. For example, the determination unit 112 may determine whether or not re-learning is to be performed based on a difference between the pulse height and the predicted pulse height and a first threshold value set in advance. Specifically, the determination unit 112 may compare freely-selected peaks included in an X-ray energy spectrum obtained from the pulse height and an X-ray energy spectrum obtained from the predicted pulse height, and may determine that re-learning is to be performed when the difference in energy between the peaks is equal to or larger than 20 eV. In this case, the criterion of determination may be set not only for the peak energy of a histogram, but also for an individual pulse height and an individual predicted pulse height. Specifically, for example, the criterion of determination may be an error index such as a mean absolute error, a mean squared error, or a coefficient of determination between the pulse height and the predicted pulse height.

Further, the determination unit 112 may determine whether or not re-learning is to be performed in accordance with a difference between the measure of dispersion of the pulse height and the measure of dispersion of the predicted pulse height at the peak of the histogram, and a second threshold value set in advance. Specifically, for example, the determination unit 112 may compare freely-selected peaks included in the X-ray energy spectrum obtained from the pulse height and the X-ray energy spectrum obtained from the predicted pulse height, and may determine that re-learning is to be performed when a difference in full width at half maximum (FWHM) between the peaks is equal to or larger than 10 eV.

Figure 10:
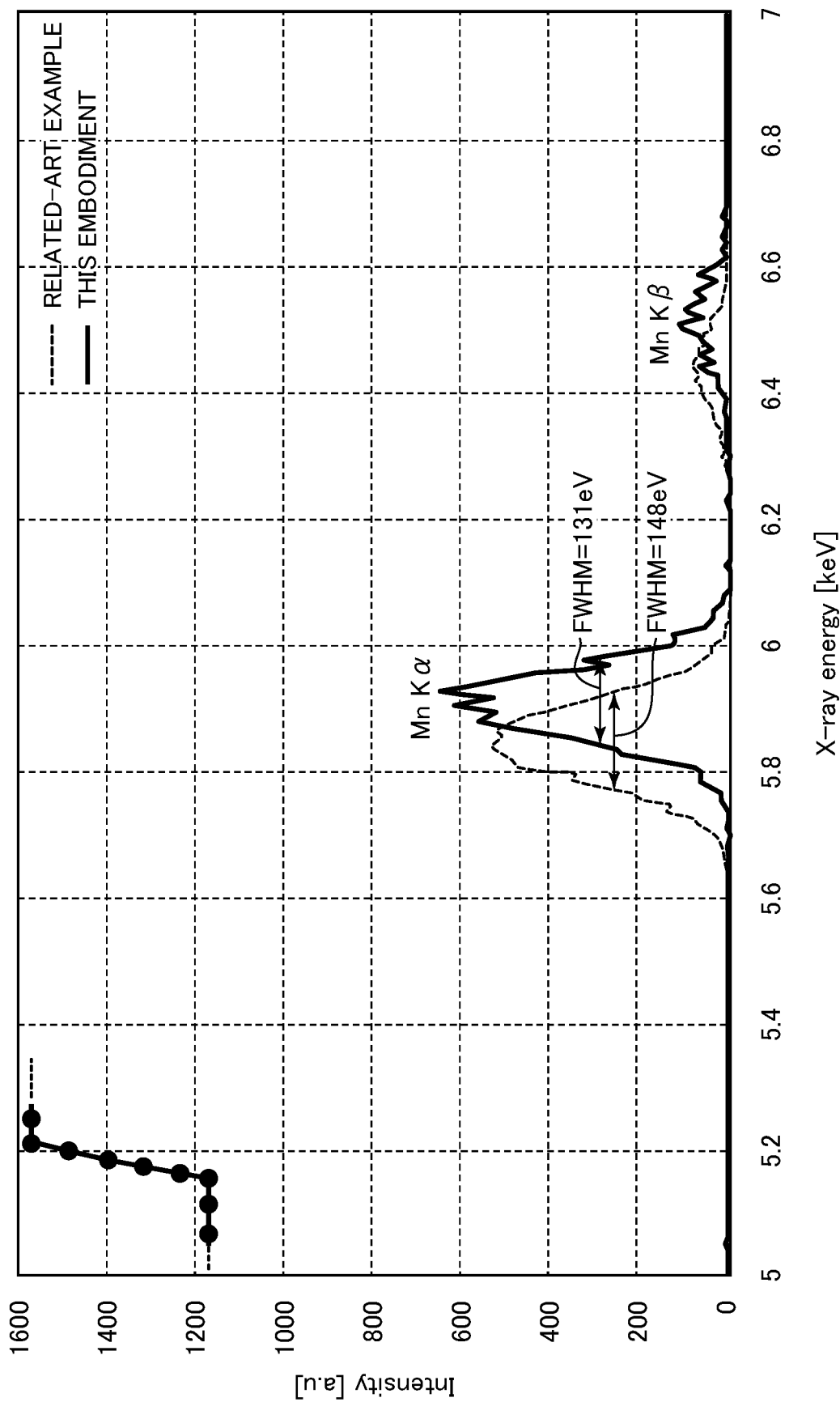
FIG. 10 is a graph for showing MnKα line energy spectra generated through use of a related-art example and the embodiment.
Figure 11:
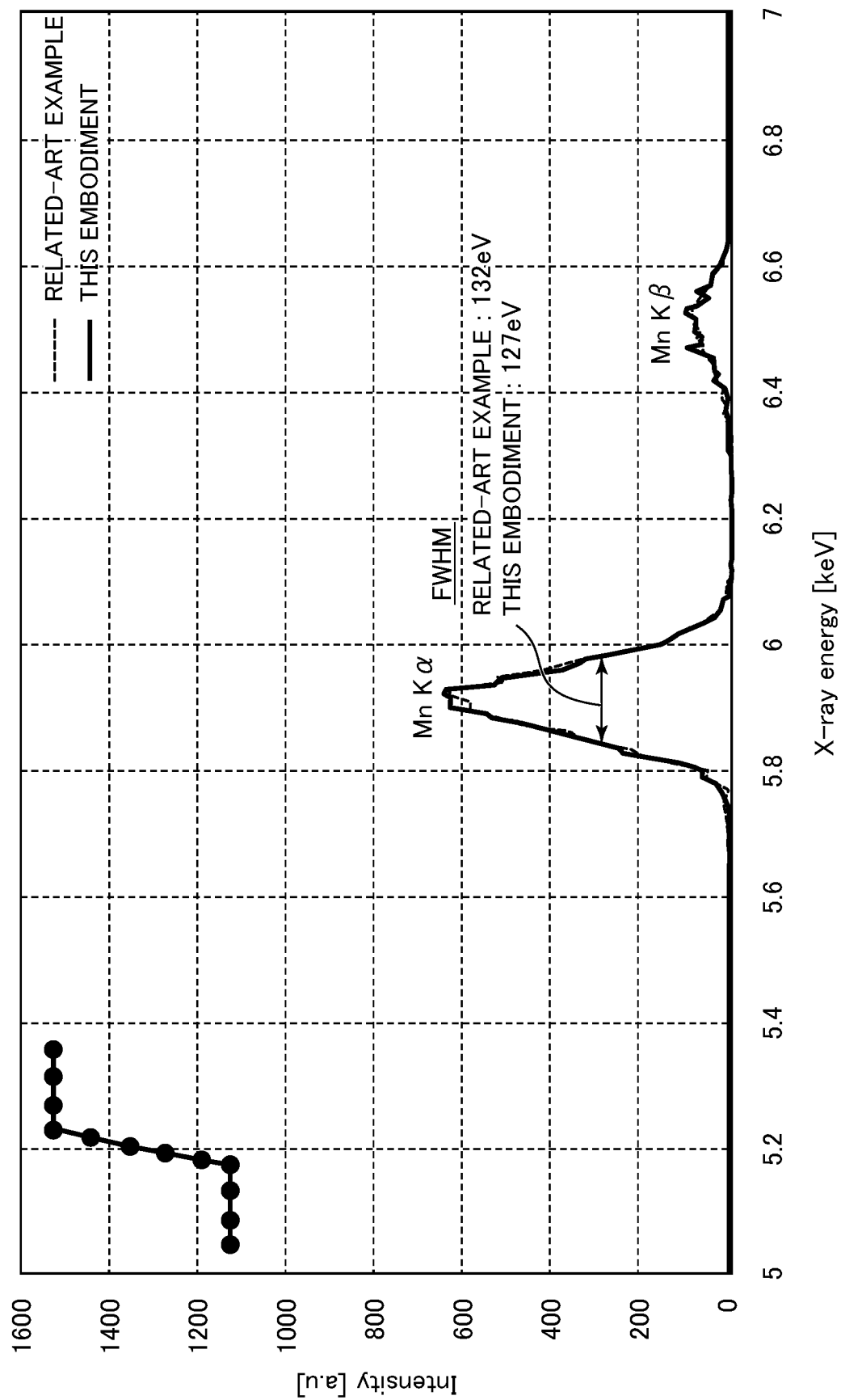
FIG. 11 is a graph for showing MnKα line energy spectra generated through use of the related-art example and the embodiment when a processing time is long.
Figure 12:
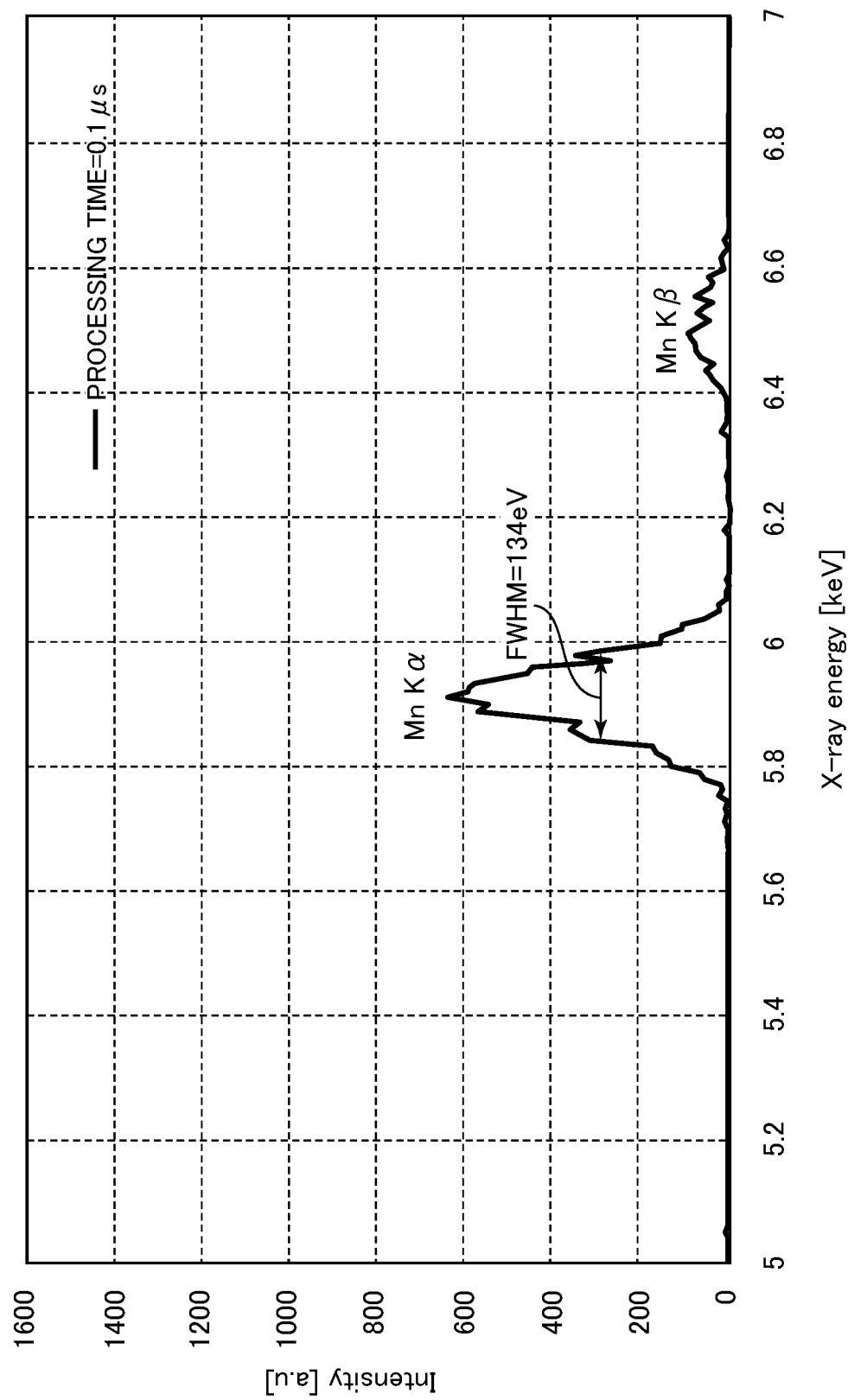
FIG. 12 is a graph for showing a MnKα line energy spectrum generated through use of the embodiment.

FIG. 10 to FIG. 12 are graphs for showing MnKα line energy spectra obtained by the trained model in this embodiment. The MnKα line energy spectra shown in FIG. 10 to FIG. 12 are results obtained by measuring X-rays emitted by a sealed radiation source $^{55}$Fe with an SDD detector. In this case, the X-rays emitted by the sealed radiation source $^{55}$Fe simulate fluorescent X-rays emitted from the sample. The X-ray signal data that has been used for learning and prediction of the pulse height is a part of the stepped wave generated by detecting the X-rays emitted by $^{55}$Fe. A rise time (width of a rise portion) of the measured stepped wave is about 0.2 μs. The X-ray signal data of FIG. 10 includes a flat portion before the rise portion, the rise portion, and a flat portion after the rise portion, and a processing time is 0.6 μs. Further, in FIG. 10, a MnKα line energy spectrum in a related-art example is shown as a comparative example. The histogram of the pulse height measured by the pulse height analyzer 212 after trapezoidal shaping is performed by the waveform shaper 210 is shown as the related-art example. Further, a time width from a rise to a fall of the trapezoidal wave is a processing time of the related-art example. The processing time of the related-art example is 0.65 μs. FIG. 11 is a graph for showing measurement results in the related-art example and this embodiment obtained when the processing time is long for comparison with FIG. 10. In FIG. 11, the processing time in the related-art example is 2.25 μs, and the processing time in this embodiment is 2 μs. As shown in FIG. 10, in the related-art example, by setting the processing time short, the energy of the MnKα line peak becomes lower, and further, the full width at half maximum (FWHM) becomes larger compared with the result of the related-art example of FIG. 11. In contrast, in this embodiment, even when the processing time is set short, the energy of the MnKα line peak does not change, and a MnKα line spectrum in which the full width at half maximum (FWHM) is smaller than in the related-art example is obtained. Further, the X-ray signal data of FIG. 12 includes only a part of the rise portion, and the processing time is 0.1 μs. As shown in FIG. 12, despite the fact that the pulse height is predicted through use of the processing time of 0.1 μs, which is shorter than 0.2 μs being the rise time of the stepped wave, the Gaussian shape is hardly lost, and a MnKα line spectrum in which the full width at half maximum (FWHM) is small is obtained.

FIG. 13 and FIG. 14 are graphs for showing full widths at half maximum (FWHM) of the MnKα line spectra at each processing time obtained by the trained model in this embodiment and the related-art method. The energy resolution obtained from the histogram of the pulse height measured by the pulse height analyzer 212 after trapezoidal shaping is performed by the waveform shaper 210 is shown as the related-art example. Further, the time width from the rise to the fall of the trapezoidal wave is the processing time of the related-art example. The X-ray signal data that has been used to acquire FIG. 13 includes at least the flat portion before the rise portion and a part of the rise portion. When the processing time is 0.1 μs to 0.2 μs, the X-ray signal data includes the flat portion before the rise portion and a part of the rise portion. When the processing time is 0.4 μs to 2.0 μs, the X-ray signal data includes the flat portion before the rise portion, the rise portion, and the flat portion after the rise portion. In contrast, the X-ray signal data that has been used to acquire FIG. 14 includes only the rise portion. When the processing time is 0.05 μs to 0.1 μs, the X-ray signal data includes only a part of the rise portion. When the processing time is 0.2 μs, the X-ray signal data includes the entire rise portion. As shown in FIG. 13 and FIG. 14, it can be understood that, compared with the related-art example, a significant improvement in energy resolution is exhibited in this embodiment, particularly in the region in which the processing time is equal to or shorter than 0.2 μs.

While the X-ray signal data of FIG. 13 includes at least the flat portion before the rise portion and the part of the rise portion, the X-ray signal data of FIG. 14 includes only the rise portion. When the incident count rate of the X-rays increases, a proportion of the rise portion caused by the incidence of the X-rays becomes larger, and a proportion of the flat portion becomes smaller. As a result, when processing is performed by including the flat portion, the X-ray signal data that cannot be processed increases, resulting in the failure to acquire the X-rays. As shown in FIG. 14, through use of the X-ray signal data including only the rise portion, the frequency of failure to acquire the X-rays can be further reduced compared with the case in which the X-ray signal data including the flat portion is used, and hence the pulse height can be measured at higher speed and with higher precision.

As described above, with the X-ray signal processing apparatus 110 in this embodiment, the pulse height can be measured at higher speed and with higher precision compared with the related-art method of applying a waveform shaping filter. As a result, the frequency of failure to acquire the X-rays can be reduced, and hence the throughput of the X-ray signal processing apparatus 110 can be increased. Further, through the generation of the trained model by the learning unit 114, this embodiment can also be applied to various types of the X-ray detector 106 and the preamplifier 202. Moreover, through the execution of re-learning as required, the predicted pulse height that is always optimal for the X-ray detector 106 can be obtained. Still further, through the measurement of the continuous X-rays emitted from the sample and the use of the continuous X-rays as the training data, it is no longer required to prepare the sample containing the measurement target element. As a result, the measurement for acquiring the training data is simplified, and at the same time, the predicted pulse height can be obtained from X-rays emitted from a sample whose elemental composition is unknown.

The learning unit 114 and the determination unit 112 in the present disclosure are formed through use of, for example, a CPU, a GPU, or a multi-core CPU, and the components of the processing unit 108 subsequent to the signal detector 206 including the pulse height predictor 218 are formed through use of a field-programmable gate array (FPGA). The trained model is implemented by the learning unit 114 executing information processing (learning step) in accordance with a computer program (pulse height prediction program). Parameters recorded in the trained model included in the learning unit 114 are written into the FPGA forming the processing unit 108, and thus the pulse height predictor 218 is built. The predicted pulse height is obtained by the pulse height predictor 218 executing information processing (pulse height prediction step).

As another configuration, the learning unit 114, the determination unit 112, and the components of the processing unit 108 subsequent to the signal detector 206 including the pulse height predictor 218 may be formed through use of, for example, an FPGA. In this configuration, the learning unit 114 arranged inside the FPGA executes information processing (learning step), and the trained model is thus generated. The obtained trained model is output to the pulse height predictor 218, and the predicted pulse height is obtained by the pulse height predictor 218 executing information processing (pulse height prediction step).

The present invention is not limited to the above-mentioned embodiment, and various modifications can be made thereto. The configuration of the X-ray spectrometer 100 described above is one example, and the present invention is not limited thereto. The configuration described above may be replaced by a configuration that is substantially the same as the configuration described in the above-mentioned embodiment, a configuration that exhibits the same action and effect as those of the configuration described in the above-mentioned embodiment, or a configuration that achieves the same object as that of the configuration described in the above-mentioned embodiment.

For example, while the case in which the X-ray spectrometer is an X-ray fluorescence spectrometer is illustrated in FIG. 1, the X-ray spectrometer is not limited thereto. The X-ray spectrometer may be a scanning electron microscope (SEM), an electron probe microanalyzer (EPMA), or particle-induced X-ray emission (PIXE), which performs analysis by applying an electron beam or a particle beam to a sample as an exciting radiation, and detecting emitted X-rays.

REFERENCE SIGNS LIST

100 X-ray spectrometer, 102 sample stage, 104 exciting radiation source, 106 X-ray detector, 108 processing unit, 110 X-ray signal processing apparatus, 112 determination unit, 114 learning unit, 202 preamplifier, 204 A/D converter, 206 signal detector, 208 waveform converter, 210 waveform shaper, 212 pulse height analyzer, 214 selector, 216 counter, 218 pulse height predictor, 502 training data acquisition unit, 504 trained model generation unit, 506 trained model output unit

The invention claimed is:

1. An X-ray spectrometer, comprising:
an exciting radiation source configured to apply an exciting radiation to a sample;
an X-ray detector configured to detect X-rays emitted from the sample to generate electric charges corresponding to energy of the X-rays;
a preamplifier configured to output an analog signal representing a temporal change of a voltage corresponding to the generated electric charges;
an A/D converter configured to convert the analog signal into a digital signal;
a signal detector configured to detect, from the digital signal, an incident time at which the X-rays enter the X-ray detector;
a waveform converter configured to convert the digital signal into a stepped wave including a flat portion before a rise portion, the rise portion, and a flat portion after the rise portion;
a waveform shaper configured to shape the stepped wave to generate a shaped wave including a step or a peak;
a pulse height analyzer configured to measure a pulse height based on the incident time and the step or peak of the shaped wave;
a learning unit configured to acquire a part of the stepped wave including the rise portion through use of the incident time, and generate a trained model which has learned a correlation between the acquired part of the stepped wave and the pulse height through use of training data including a plurality of combinations of the acquired part of the stepped wave and the pulse height; and
a pulse height predictor configured to acquire a part of the stepped wave from the stepped wave newly converted by the waveform converter through use of the incident time, and calculate a predicted pulse height from the acquired part of the stepped wave and the trained model,
wherein the acquired part of the stepped wave included in the training data is a part of the rise portion, and
wherein the pulse height predictor is configured to acquire a part of the rise portion from the stepped wave newly converted by the waveform converter through use of the incident time, and calculate a predicted pulse height from the acquired part of the rise portion and the trained model.

2. The X-ray spectrometer according to claim 1, further comprising a selector configured to select any one of the pulse height and the predicted pulse height and output the selected one of the pulse height and the predicted pulse height.

3. The X-ray spectrometer according to claim 2, wherein the selector is configured to select any one of the pulse height and the predicted pulse height and output the selected one of the pulse height and the predicted pulse height in accordance with an incident count rate of the X-rays into the X-ray detector.

4. The X-ray spectrometer according to claim 1, further comprising a determination unit configured to determine whether re-learning is to be performed based on the pulse height and the predicted pulse height.

5. The X-ray spectrometer according to claim 4, wherein the determination unit is configured to determine whether re-learning is to be performed in accordance with a difference between the pulse height and the predicted pulse height, and a first threshold value set in advance.

6. The X-ray spectrometer according to claim 4, further comprising a counter configured to perform counting for each pulse height or each predicted pulse height to generate a histogram,
wherein the determination unit is configured to determine whether re-learning is to be performed in accordance with a difference between a measure of dispersion of the pulse height and a measure of dispersion of the predicted pulse height at a peak of the histogram, and a second threshold value set in advance.

7. The X-ray spectrometer according to claim 1, wherein the sample to be used to acquire the training data is a sample that is free from an analysis target element.

8. The X-ray spectrometer according to claim 7, wherein the sample is graphite or acrylic.

9. The X-ray spectrometer according to claim 1, wherein the trained model is built through use of a regression algorithm of machine learning.

10. The X-ray spectrometer according to claim 9, wherein the trained model is built through use of a decision tree algorithm.

11. A non-transitory computer-readable information storage medium for storing a pulse height prediction program which is executed by an information processing apparatus to be used for an X-ray spectrometer,
the X-ray spectrometer including:
an exciting radiation source configured to apply an exciting radiation to a sample;
an X-ray detector configured to detect X-rays emitted from the sample to generate electric charges corresponding to energy of the X-rays;
a preamplifier configured to output an analog signal representing a temporal change of a voltage corresponding to the generated electric charges;

an A/D converter configured to convert the analog signal into a digital signal;

a signal detector configured to detect, from the digital signal, an incident time at which the X-rays enter the X-ray detector;

a waveform converter configured to convert the digital signal into a stepped wave including a flat portion before a rise portion, the rise portion, and a flat portion after the rise portion;

a waveform shaper configured to shape the stepped wave to generate a shaped wave including a step or a peak; and a pulse height analyzer configured to measure a pulse height based on the incident time and the step or peak of the shaped wave;

the pulse height prediction program causing the information processing apparatus to execute:

a learning step of acquiring a part of the stepped wave including the rise portion through use of the incident time, and generating a trained model which has learned a correlation between the acquired part of the stepped wave and the pulse height through use of training data including a plurality of combinations of the acquired part of the stepped wave and the pulse height; and a pulse height prediction step of acquiring a part of the stepped wave from the stepped wave newly converted by the waveform converter through use of the incident time, and calculating a predicted pulse height from the acquired part of the stepped wave and the trained model, wherein the acquired part of the stepped wave included in the training data is a part of the rise portion, and wherein a part of the rise portion is acquired from the stepped wave newly converted by the waveform converter through use of the incident time, and a predicted pulse height is calculated from the acquired part of the rise portion and the trained model in the pulse height prediction step.

* * * * *